(12) United States Patent
Jeng et al.

(10) Patent No.: US 8,193,258 B2
(45) Date of Patent: Jun. 5, 2012

(54) SEALANT COMPOSITION

(75) Inventors: Jauder Jeng, Taichung (TW); Man-Lin Chen, Miaoli County (TW); Pei-Ching Liu, Miaoli County (TW); Tien-Shou Shieh, Taipei (TW)

(73) Assignee: Industrial Technology Research Institute (TW)

( * ) Notice: Subject to any disclaimer, the term of this patent is extended or adjusted under 35 U.S.C. 154(b) by 318 days.

(21) Appl. No.: 12/546,862

(22) Filed: Aug. 25, 2009

(65) Prior Publication Data
US 2010/0280143 A1    Nov. 4, 2010

(30) Foreign Application Priority Data

May 1, 2009    (TW) ................................ 98114610 A

(51) Int. Cl.
*C08F 2/50*    (2006.01)
*C08L 63/10*    (2006.01)

(52) U.S. Cl. ............... 522/40; 522/64; 522/83; 522/100

(58) Field of Classification Search .................... 522/40, 522/83, 170, 100, 103, 64
See application file for complete search history.

(56) References Cited

U.S. PATENT DOCUMENTS

| | | | |
|---|---|---|---|
| 5,596,024 A * | 1/1997 | Horie et al. | 522/103 |
| 6,475,701 B2 * | 11/2002 | Ohno et al. | 430/280.1 |
| 7,521,100 B2 * | 4/2009 | Imaizumi et al. | 428/1.53 |
| 2007/0021524 A1 * | 1/2007 | Watanabe et al. | 522/170 |
| 2007/0166642 A1 * | 7/2007 | Inoue | 430/270.1 |
| 2008/0063816 A1 * | 3/2008 | Imalzumi et al. | 428/1.52 |

FOREIGN PATENT DOCUMENTS

| | | |
|---|---|---|
| EP | 1835333 A1 | 9/2007 |
| JP | 2007-156183 A | 6/2007 |
| JP | 2008-116825 A | 5/2008 |
| WO | 2004/108790 A1 | 12/2004 |

* cited by examiner

*Primary Examiner* — Susan W Berman
(74) *Attorney, Agent, or Firm* — Lowe Hauptman Ham & Berner, LLP

(57) ABSTRACT

A sealant composition is provided. The sealant composition includes (a) an oligomer including an unsaturated mono-carboxylic acid modified bisphenol A epoxy resin and an unsaturated mono-carboxylic acid modified bisphenol F epoxy resin, wherein an equivalence ratio of the bisphenol A epoxy resin to the bisphenol F epoxy resin is 0.05:0.95 to 0.3:0.7, the bisphenol A epoxy resin has a melting point higher than 40° C. and the bisphenol F epoxy resin has a melting point lower than 40° C.; (b) an epoxy resin having at least two or more than two epoxy groups; and (c) a photoinitiator.

21 Claims, No Drawings

SEALANT COMPOSITION

CROSS REFERENCE TO RELATED APPLICATIONS

This Application claims priority of Taiwan Patent Application No. 98114610, filed on May 1, 2009, the entirety of which is incorporated by reference herein.

BACKGROUND OF THE INVENTION

1. Field of the Invention

The invention relates to a sealant, and more particularly to a sealant composition for a one drop filling (ODF) process of a liquid crystal display panel.

2. Description of the Related Art

Advanced development for sealant materials and methods thereof, have recently been driven by demand for large-sized liquid crystal displays (LCDs). For large-sized LCD panels (larger than 32 inches), a one drop filling (ODF) process is utilized to fill the liquid crystals of the LCD panels during fabrication thereof. After respectively forming alignment layers on two glass substrates, a sealant is dispersed on one of the two glass substrates. Then, liquid crystals are dropped on the glass substrate having the sealant thereon. Next, the two glass substrates are aligned, and then bonded and assembled. Then, the sealant material is cured. The ODF process takes minimal time and is cost efficient. Therefore, utilizing the ODF process contributes to higher yield rates of display panels made therewith.

The sealant in the ODF process is used to bond the two glass substrates, and also prevent the liquid crystals from pollution, avoid liquid crystal leakage, and avoid water vapor and oxygen from permeating into the LCD panels. Currently, sealant materials used for the ODF process are mainly crystallized acrylic modified epoxy resin. International (PCT) Patent No. WO2004-108790, Europe Patent No. EP1835333, Japan Patent No. JP2007-156183 and JP2008-116825 disclose utilizing an epoxy resin which contains acrylic and epoxy groups on a molecular chain, a mono-functional group-containing acrylic modified epoxy resin, an epoxy resin which contains aliphatic, aromatic or cyclic ester functional group on a molecular chain or an epoxy resin which contains secondary alkyl or tertiary alkyl on a molecular chain for the sealant material. In addition, acrylic monomer used to modify the epoxy resin can have imino groups thereon and the sealant materials may contain a light-shielding colorant. For the acrylic modified bisphenol F epoxy resin, a p,p'-isomer thereof is more than 40%. Meanwhile, the sealant materials further include a UV photosensitive and thermal cured typed curing agent, a thermal cracked free radical typed curing agent or a thermal curing agent of hydrizide, diazide or tertiary amine compounds.

BRIEF SUMMARY OF THE INVENTION

The invention provides a sealant composition, comprising: (a) an oligomer including an unsaturated mono-carboxylic acid modified bisphenol A epoxy resin and an unsaturated mono-carboxylic acid modified bisphenol F epoxy resin, wherein the bisphenol A epoxy resin to the bisphenol F epoxy resin has an equivalence ratio of 0.05:0.95 to 0.3:0.7, the bisphenol A epoxy resin has a melting point higher than 40° C. and the bisphenol F epoxy resin has a melting point lower than 40° C.; (b) an epoxy resin containing at least two or more than two epoxy groups; and (c) a photoinitiator.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

The sealant compositions of the invention are mainly used as sealant materials of liquid crystal display (LCD) panels formed by the one drop filling (ODF) process. The sealant compositions of the invention have advantages such as excellent adhesion strength, rapid curing ability, and high durability. Additionally, when applying the sealant compositions of the invention, the sealant compositions do not mix with liquid crystals of the LCD panels. The sealant compositions of the invention utilize an unsaturated mono-carboxylic acid to modify bisphenol A epoxy resin and bisphenol F epoxy resin to form an oligomer. Then, the oligomer is combined with an epoxy resin containing at least two or more than two epoxy groups and a photoinitiator to form the sealant compositions of the invention.

In an embodiment of the invention, the sealant composition comprises:

(a) an oligomer, which is consisted of an unsaturated mono-carboxylic acid modified bisphenol A epoxy resin and an unsaturated mono-carboxylic acid modified bisphenol F epoxy resin, wherein an equivalence ratio of the bisphenol A epoxy resin to the bisphenol F epoxy resin may be 0.05:0.95 to 0.3:0.7, and the bisphenol A epoxy resin may have a melting point higher than 40° C. and the bisphenol F epoxy resin may have a melting point lower than 40° C.;

(b) an epoxy resin containing at least two or more than two epoxy groups; and (c) a photoinitiator.

In the sealant compositions of the invention, based on 100 parts by weight of the oligomer, the epoxy resin containing at least two or more than two epoxy groups may be 20 to 60 parts by weight and the photoinitiator may be 2 to 10 parts by weight.

The unsaturated mono-carboxylic acid used, for example, may be acrylic acid, methylacrylic acid, styrene-acrylic acid, furylacrylic acid, crotonic acid or cyano cinnamic acid. The oligomer is formed by utilizing a bisphenol A epoxy resin and a bisphenol F epoxy resin with various equivalence ratios to react with an unsaturated mono-carboxylic acid. An equivalence ratio of the unsaturated mono-carboxylic acid to the sum of the bisphenol A epoxy resin and the bisphenol F epoxy resin may be 1.1:1, and an equivalence ratio of the bisphenol A epoxy resin to the bisphenol F epoxy resin may be 0.05:0.95 to 0.3:0.7.

In an embodiment of the invention, the bisphenol A epoxy resin may have a melting point higher than 40° C. and an epoxy equivalent value of the bisphenol A epoxy resin may be between 450 and 600. The bisphenol F epoxy resin may have a melting point lower than 40° C. and an epoxy equivalent value of the bisphenol F epoxy resin may be between 150 and 300.

The epoxy resin containing at least two or more than two epoxy groups may be bisphenol A epoxy resin or derivatives thereof, bisphenol F epoxy resin or derivatives thereof, phenolic epoxy resin, naphthalene epoxy resin, aliphatic epoxy resin or cycloaliphatic epoxy resin. The photoinitiator may be a α-benzoin compound or derivatives thereof, or a bis acyl phosphine compound or derivatives thereof, for example 1-hydroxycyclohexyl benzophenone (Irgacure 184) or bi-acyl phosphoric oxide (Irgacure 819).

Moreover, in order to enhance the physical properties of the sealant materials, the sealant compositions of the invention can further contain other additives, such as a thermal curing agent, an acrylic functional group-containing monomer, a filler and a silane coupling agent etc. In the sealant compositions of the invention, based on 100 parts by weight of the oligomer, the thermal curing agent may be about 1 to 10 parts by weight, the acrylic functional group-containing monomer may be about 5 to 30 parts by weight, the filler may be about 10 to 50 parts by weight, and the silane coupling agent may be about 2 to 10 parts by weight.

The thermal curing agent may be a derivative of an imidazole or imidazoline compound, for example 2-phenylimidazole, 2-methylimidazole, 2-undecylimidazole, 2-undecyl-4,5-diformylimidazole, 2-heptadecylimidazole, 2-n-butyl-4,5-diformylimidazole, 2-phenyl-4-thiocarbamoyl-imidazole, 2-ethyl-imidazole, 2-n-propyl-imidazole, 2-n-butyl-imidazole, 2-ethyl-4-methylimidazole, 1-methylimidazole, 1-methyl-2-ethylimidazole, 1-benzyl-imidazole, 1-benzyl-2-methylimidazole, 1-benzyl-2-phenylimidazole, 2-methylimidazoline or 2-phenylimidazoline, which has a melting point of about 60 to 100° C.

The acrylic functional group-containing monomer may be a mono-functional group, a bi-functional group, a tri-functional group or a multi-functional group-containing acrylic monomer, for example 2-phenoxyethyl acrylate, 2-phenoxyethyl methacrylate, tripropylene glycol diacrylate, 1,6-hexanediol dimethacrylate, pentaerythritol triacrylate or ethoxylated trimethylolpropane triacrylate. The filler may be silicon dioxide, talc, aluminum oxide or clay. The silane coupling agent may be 3-methacryloxypropyltrimethoxysilane.

The compositions, the ratios of the compositions, the fabrication methods and the characteristics of the sealant materials for the Examples and the Comparative Examples are described in detail as below:

Preparing the Examples: Synthesis of the Oligomer of the Examples

A bisphenol A epoxy resin having a melting point higher than 40° C., a bisphenol F epoxy resin having a melting point lower than 40° C., and a thermal inhibitor of methyl ether hydroquinone (MEHQ) were put in a reaction vessel to be preheated and uniformly mixed to form a mixture. After reaching a temperature of 110° C., acrylic acid and a catalyst such as 2,2'-methylenebis(4-methyl-6-tert-butylphenol) (MBP), 2,2'-methylenebis(4-ethyl-6-tert-butylphenol) (EBP) or methyl ether hydroquinone (MEHQ) were added in the mixture to react for 5 hours to form an epoxy-acrylate oligomer. For the reaction, an equivalence ratio of acrylic acid to the sum of the bisphenol A epoxy resin and the bisphenol F epoxy resin was 1.1:1. For the oligomers of the Examples, an equivalence ratio of the bisphenol A epoxy resin to the bisphenol F epoxy resin and the components of the oligomers are shown in Table 1.

Examples 1-17

The compositions, the ratios of the compositions and the characteristics of the sealant materials of the Examples 1-17 are shown in Table 1, wherein viscosities of the sealant materials of Examples 1-17 were controlled at about 30±5 ten thousand mPa·s.

TABLE 1

The sealant compositions and the characteristics of the Examples 1-17

| oligomer | component | equivalence ratio | Example 1 | Example 2 | Example 3 | Example 4 | Example 5 | Example 6 |
|---|---|---|---|---|---|---|---|---|
| | | | parts by weight | | | | | |
| | R301:830S | 0.05:0.95 | 100 | — | — | — | — | — |
| | | 0.1:0.9 | — | 100 | — | — | — | — |
| | | 0.2:0.8 | — | — | 100 | — | — | — |
| | | 0.3:0.7 | — | — | — | 100 | — | — |
| | R302:835LV | 0.05:0.95 | — | — | — | — | 100 | — |
| | | 0.1:0.9 | — | — | — | — | — | 100 |
| | | 0.2:0.8 | — | — | — | — | — | — |
| | | 0.3:0.7 | — | — | — | — | — | — |
| | R302:830S | 0.1:0.9 | — | — | — | — | — | — |
| | R301:835LV | 0.1:0.9 | — | — | — | — | — | — |
| | R307:830S | 0.05:0.95 | — | — | — | — | — | — |
| | R307:835LV | 0.05:0.95 | — | — | — | — | — | — |
| photoinitiator | Irgacure-184 | | 3 | 3 | 3 | 3 | 3 | 3 |
| | Irgacure-819 | | 3 | 3 | 3 | 3 | 3 | 3 |
| | epoxy resin | | 35 | 35 | 35 | 35 | 35 | 35 |
| | thermal curing agent | | 1.2 | 1.2 | 1.2 | 1.2 | 1.2 | 1.2 |
| | acrylic functional group-containing monomer | | 7.1 | 7.1 | 7.1 | 7.1 | 7.1 | 7.1 |
| | filler | | 14.3 | 14.3 | 14.3 | 14.3 | 14.3 | 14.3 |
| | silane coupling agent | | 3.2 | 3.2 | 3.2 | 3.2 | 3.2 | 3.2 |
| adhesion test | UV curing | | Δ | Δ | Δ | Δ | Δ | Δ |
| | UV+ thermal curing | | ○ | ○ | ○ | ○ | ○ | ○ |

| oligomer | component | equivalence ratio | Example 7 | Example 8 | Example 9 | Example 10 | Example 11 | Example 12 |
|---|---|---|---|---|---|---|---|---|
| | | | parts by weight | | | | | |
| | R301:830S | 0.05:0.95 | — | — | — | — | — | — |
| | | 0.1:0.9 | — | — | — | — | — | — |
| | | 0.2:0.8 | — | — | — | — | — | — |
| | | 0.3:0.7 | — | — | — | — | — | — |

TABLE 1-continued

The sealant compositions and the characteristics of the Examples 1-17

| oligomer | component | equivalence ratio | | | | | | |
|---|---|---|---|---|---|---|---|---|
| | R302:835LV | 0.05:0.95 | — | — | — | — | — | — |
| | | 0.1:0.9 | — | — | — | — | — | — |
| | | 0.2:0.8 | 100 | — | — | — | — | — |
| | | 0.3:0.7 | — | 100 | — | — | — | — |
| | R302:830S | 0.1:0.9 | — | — | 100 | — | — | — |
| | R301:835LV | 0.1:0.9 | — | — | — | 100 | — | — |
| | R307:830S | 0.05:0.95 | — | — | — | — | 100 | — |
| | R307:835LV | 0.05:0.95 | — | — | — | — | — | 100 |
| photoinitiator | Irgacure-184 | | 3 | 3 | 3 | 3 | 3 | 3 |
| | Irgacure-819 | | 3 | 3 | 3 | 3 | 3 | 3 |
| epoxy resin | | | 35 | 35 | 35 | 35 | 35 | 35 |
| thermal curing agent | | | 1.2 | 1.2 | 1.2 | 1.2 | 1.2 | 1.2 |
| acrylic functional group-containing monomer | | | 7.1 | 7.1 | 7.1 | 7.1 | 7.1 | 7.1 |
| filler | | | 14.3 | 14.3 | 14.3 | 14.3 | 14.3 | 14.3 |
| silane coupling agent | | | 3.2 | 3.2 | 3.2 | 3.2 | 3.2 | 3.2 |
| adhesion test | UV curing | | Δ | Δ | Δ | Δ | Δ | Δ |
| | UV+ thermal curing | | ○ | ○ | ○ | ○ | ○ | ○ |

| oligomer | component | equivalence ratio | Example 13 | Example 14 | Example 15 | Example 16 | Example 17 |
|---|---|---|---|---|---|---|---|
| | | | | | parts by weight | | |
| | R301:830S | 0.05:0.95 | — | — | — | — | — |
| | | 0.1:0.9 | — | — | — | — | — |
| | | 0.2:0.8 | 100 | 100 | 100 | — | — |
| | | 0.3:0.7 | — | — | — | — | — |
| | R302:835LV | 0.05:0.95 | — | — | — | 100 | 100 |
| | | 0.1:0.9 | — | — | — | — | — |
| | | 0.2:0.8 | — | — | — | — | — |
| | | 0.3:0.7 | — | — | — | — | — |
| | R302:830S | 0.1:0.9 | — | — | — | — | — |
| | R301:835LV | 0.1:0.9 | — | — | — | — | — |
| | R307:830S | 0.05:0.95 | — | — | — | — | — |
| | R307:835LV | 0.05:0.95 | — | — | — | — | — |
| photoinitiator | Irgacure-184 | | 6 | 2 | 1 | 5 | 1 |
| | Irgacure-819 | | 4 | 2 | 2 | 5 | 1 |
| epoxy resin | | | 20 | 50 | 60 | 20 | 60 |
| thermal curing agent | | | 1.2 | 1.2 | 1.2 | 1.2 | 1.2 |
| acrylic functional group-containing monomer | | | 7.1 | 7.1 | 7.1 | 7.1 | 7.1 |
| filler | | | 14.3 | 14.3 | 14.3 | 14.3 | 14.3 |
| silane coupling agent | | | 3.2 | 3.2 | 3.2 | 3.2 | 3.2 |
| adhesion test | UV curing | | Δ | Δ | Δ | Δ | Δ |
| | UV+ thermal curing | | ○ | ○ | ○ | ○ | ○ |

Δ: adhesion strength larger than 30 kgf and smaller than 50 kgf;
○: adhesion strength larger than 50 kgf.

In Table 1, the bisphenol A epoxy resin R301 had a melting point of 67-75° C., the bisphenol A epoxy resin R302 had a melting point of 78-85° C., and the bisphenol A epoxy resin R307 had a melting point of 86-94° C. The bisphenol A epoxy resin R301, R302 and R307 were products of Mitsui Petrochemical Industries, and had an epoxy equivalent value of 475, 570 and 720, respectively. The bisphenol F epoxy resin 830S and 835LV were products of Dainippon Ink&Chemicals, which were in a liquid state at room temperature and had an epoxy equivalent value of 171 and 165, respectively. The photoinitiator Irgacure-184 and Irgacure-819 were products of Ciba Company. Another epoxy resin containing at least two or more than two epoxy groups was bisphenol F epoxy resin 830S. The thermal curing agent was 2-undecylimidazole. The acrylic functional group-containing monomer was pentaerythritol triacrylate, which was used for a photo-reactive monomer. The filler was silicon oxide. The silane coupling agent was 3-methacryloxypropyltrimethoxysilane.

The tensile-shear adhesion test of the sealant compositions of Examples 1-17 was performed by dispersing the sealant materials between two ITO glass substrates. The connection between the two ITO glass substrates was by upper to lower bonding and the two ITO glass substrates partially overlapped. The overlapped contact area was a dispersed area of the sealant material. The dispersed area of the sealant material was a dot-shaped area with a diameter of about 5.88 mm, which had a thickness of about 0.07 mm. The curing methods of the sealant materials was curing by UV light of 365 nm from mercury light for 120 seconds, or curing by UV light and thermal curing at 120° C. for one hour. The two bonded ITO glass substrates were pulled by a bi-pillar-typed tension equipment (QC Teck) along upper and lower directions until the two ITO glass substrates were separated. The higher tension strengths represented that the adhesion strength between the sealant materials and the ITO glass substrates were better. In Table 1, the sign of A represented that the adhesion strength was larger than 30 kgf and smaller than 50 kgf, and the sign of ○ represented that the adhesion strength was larger than 50 kgf.

As shown in Table 1, the adhesion strengths of the sealant materials cured by UV light and thermal curing were better than those only cured by UV light.

Comparative Examples 1-6

The compositions, the ratios of the compositions and the characteristics of the sealant materials of Comparative Examples 1-6 are shown in Table 2.

adhesion strength was smaller than 30 kgf and the sign of Δ represented that the adhesion strength was larger than 30 kgf and smaller than 50 kgf.

As shown in Table 1 and Table 2, the adhesion strength of the sealant materials of the Examples were better than that of the Comparative Examples. The oligomer of the sealant compositions of the Examples were formed by utilizing acrylic acid to modify the bisphenol A epoxy resin and the bisphenol F epoxy resin. However, the oligomer of the sealant compositions of the Comparative Examples were formed from acrylic acid modified bisphenol A epoxy resin, acrylic acid modified bisphenol F epoxy resin, acrylic acid modified two

TABLE 2

The sealant compositions and the characteristics of the Comparative Examples 1-6

| composition | | | Comparative Example 1 | Comparative Example 2 | Comparative Example 3 |
|---|---|---|---|---|---|
| oligomer | component | equivalence ratio | parts by weight | | |
| | E828 | 1 | 100 | — | — |
| | 830S | 1 | — | 100 | — |
| | E828:830S | 0.1:0.9 | — | — | 100 |
| | R309:830S | 0.1:0.9 | — | — | — |
| | R309:830S | 0.05:0.95 | — | — | — |
| | R309:E828 | 0.05:0.95 | — | — | — |
| photoinitiator | Irgacure-184 | | 3 | 3 | 3 |
| | Irgacure-819 | | 3 | 3 | 3 |
| epoxy resin | | | 35 | 35 | 35 |
| thermal curing agent | | | 1.2 | 1.2 | 1.2 |
| acrylic functional group-containing monomer | | | 7.1 | 7.1 | 7.1 |
| filler | | | 14.3 | 14.3 | 14.3 |
| silane coupling agent | | | 3.2 | 3.2 | 3.2 |
| adhesion test | UV curing | | X | Δ | Δ |
| | UV+ thermal curing | | Δ | Δ | Δ |

| composition | | | Comparative Example 4 | Comparative Example 5 | Comparative Example 6 |
|---|---|---|---|---|---|
| oligomer | component | equivalence ratio | parts by weight | | |
| | E828 | 1 | — | — | — |
| | 830S | 1 | — | — | — |
| | E828:830S | 0.1:0.9 | — | — | — |
| | R309:830S | 0.1:0.9 | 100 | — | — |
| | R309:830S | 0.05:0.95 | — | 100 | — |
| | R309:E828 | 0.05:0.95 | — | — | 100 |
| photoinitiator | Irgacure-184 | | 3 | 3 | 3 |
| | Irgacure-819 | | 3 | 3 | 3 |
| epoxy resin | | | 35 | 35 | 35 |
| thermal curing agent | | | 1.2 | 1.2 | 1.2 |
| acrylic functional group-containing monomer | | | 7.1 | 7.1 | 7.1 |
| filler | | | 14.3 | 14.3 | 14.3 |
| silane coupling agent | | | 3.2 | 3.2 | 3.2 |
| adhesion test | UV curing | | X | X | X |
| | UV+ thermal curing | | Δ | Δ | Δ |

X: adhesion strength smaller than 30 kgf;
Δ: adhesion strength larger than 30 kgf and smaller than 50 kgf.

In Table 2, E828 and R309 were bisphenol A epoxy resin. E828 was a product of Shell Chemical, which had an epoxy equivalent value of 192 and was in a liquid state at room temperature. R309 was a product of Mitsui Petrochemical Industries, which had a melting point of 110-135° C. and an epoxy equivalent value of 1960. 830S was bisphenol F epoxy resin. The photoinitiator, another epoxy resin, the thermal curing agent, the acrylic functional group-containing monomer, the filler and the silane coupling agent of Table 2 were the same as that of Table 1.

The tensile-shear adhesion test of the sealant compositions of the Comparative Examples 1-6 were the same as that of the Examples 1-17. In Table 2, the sign of X represented that the kinds of bisphenol A epoxy resin or acrylic acid modified bisphenol A epoxy resin with bisphenol F epoxy resin, wherein the bisphenol A epoxy resin R309 of the sealant compositions of the Comparative Examples had an epoxy equivalent value of 1960. The epoxy equivalent value of the bisphenol A epoxy resin in the sealant compositions of the Comparative Examples was too large, such that the viscosity of the sealant materials of the Comparative Examples was too high and the sealant materials of the Comparative Examples was not easy to use. Accordingly, the oligomer of the sealant compositions of the invention were formed by utilizing acrylic acid to modify the bisphenol A epoxy resin and the bisphenol F epoxy resin and controlling the epoxy equivalent values of the bisphenol A epoxy resin and the bisphenol F epoxy resin, such that the best sealant compositions were achieved and the adhesion strength of the sealant materials were enhanced.

In addition, the sealant compositions of the invention were consisted of a photo-curing and thermal-curing combined resin for sealant materials. The sealant materials have several advantages such as enhanced adhesion strength, rapid curing, and excellent durability. Also, the sealant materials of the invention do not mix with liquid crystals. Therefore, the sealant compositions of the invention are suitable for use as sealant materials of liquid crystal display panels in a one drop filling (ODF) process.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sealant composition, comprising:
   (a) an oligomer, including an unsaturated mono-carboxylic acid modified bisphenol A epoxy resin and an unsaturated mono-carboxylic acid modified bisphenol F epoxy resin, wherein the bisphenol A epoxy resin to the bisphenol F epoxy resin has an equivalence ratio of 0.05:0.95 to 0.3:0.7, and the bisphenol A epoxy resin has a melting point higher than 40° C. and the bisphenol F epoxy resin has a melting point lower than 40° C.;
   (b) an epoxy resin, containing at least two or more than two epoxy groups; and
   (c) a photoinitiator.

2. The sealant composition as claimed in claim 1, wherein the bisphenol A epoxy resin has an epoxy equivalent value of 450 to 600.

3. The sealant composition as claimed in claim 1, wherein the bisphenol F epoxy resin has an epoxy equivalent value of 150 to 300.

4. The sealant composition as claimed in claim 1, wherein the unsaturated mono-carboxylic acid comprises acrylic acid, methylacrylic acid, styrene-acrylic acid, furylacrylic acid, crotonic acid or cyano cinnamic acid.

5. The sealant composition as claimed in claim 1, wherein the unsaturated mono-carboxylic acid to the sum of the bisphenol A epoxy resin and the bisphenol F epoxy resin has an equivalence ratio of 1.1:1.

6. The sealant composition as claimed in claim 1, wherein the epoxy resin containing at least two or more than two epoxy groups comprises bisphenol A epoxy resin or derivatives thereof, bisphenol F epoxy resin or derivatives thereof, phenolic epoxy resin, naphthalene epoxy resin, aliphatic epoxy resin or cycloaliphatic epoxy resin.

7. The sealant composition as claimed in claim 1, wherein the photoinitiator comprises α-benzoin compound or derivatives thereof, or bis acyl phosphine compound or derivatives thereof.

8. The sealant composition as claimed in claim 1, wherein the oligomer is 100 parts by weight, the epoxy resin containing at least two or more than two epoxy groups is 20 to 60 parts by weight, the photoinitiator is 2 to 10 parts by weight.

9. The sealant composition as claimed in claim 1, further comprising a thermal curing agent.

10. The sealant composition as claimed in claim 9, wherein the thermal curing agent is 1 to 10 parts by weight based on 100 parts by weight of the oligomer.

11. The sealant composition as claimed in claim 9, wherein the thermal curing agent comprises a derivative of an imidazole or imidazoline compound.

12. The sealant composition as claimed in claim 9, wherein the thermal curing agent comprises 2-phenylimidazole, 2-methylimidazole, 2-undecylimidazole, 2-undecyl-4,5-diformylimidazole, 2-heptadecylimidazole, 2-n-butyl-4,5-diformylimidazole, 2-phenyl-4-thiocarbamoyl-imidazole, 2-ethyl-imidazole, 2-n-propyl-imidazole, 2-n-butyl-imidazole, 2-ethyl-4-methylimidazole, 1-methylimidazole, 1-methyl-2-ethylimidazole, 1-benzyl-imidazole, 1-benzyl-2-methylimidazole, 1-benzyl-2-phenylimidazole, 2-methylimidazoline or 2-phenylimidazoline.

13. The sealant composition as claimed in claim 9, wherein the thermal curing agent has a melting point of 60 to 100° C.

14. The sealant composition as claimed in claim 1, further comprising an acrylic functional group-containing monomer.

15. The sealant composition as claimed in claim 14, wherein the acrylic functional group-containing monomer is 5 to 30 parts by weight based on 100 parts by weight of the oligomer.

16. The sealant composition as claimed in claim 14, wherein the acrylic functional group-containing monomer comprises a mono-functional group, a bi-functional group, a tri-functional group or a multi-functional group acrylic monomer.

17. The sealant composition as claimed in claim 1, further comprising a filler.

18. The sealant composition as claimed in claim 17, wherein the filler is 10 to 50 parts by weight based on 100 parts by weight of the oligomer.

19. The sealant composition as claimed in claim 17, wherein the filler comprises silicon dioxide, talc, aluminum oxide or clay.

20. The sealant composition as claimed in claim 1, further comprising a silane coupling agent.

21. The sealant composition as claimed in claim 20, wherein the silane coupling agent is 2 to 10 parts by weight based on 100 parts by weight of the oligomer.

* * * * *